UNITED STATES PATENT OFFICE.

GEORGE ULRICH, OF ERIE, PENNSYLVANIA.

MEDICINAL COMPOUND.

SPECIFICATION forming part of Letters Patent No. 268,962, dated December 12, 1882.

Application filed October 9, 1882. (No specimens.)

*To all whom it may concern:*

Be it known that I, GEORGE ULRICH, a citizen of the United States, residing at Erie, in the county of Erie and State of Pennsylvania, have invented certain new and useful Improvements in Medicinal Compounds; and I do declare the following to be a full, clear, and exact description of the invention, such as will enable others skilled in the art to which it appertains to make and use the same.

I first take the following ingredients, and in the quantities specified: sarsaparilla-root, (*Smilax sarsaparilla*,) three hundred and eighty-four drams; juniper-berries, (*Baccæ juniperi*,) three hundred and eighty-four drams; sassafras-bark, (*Cortex sassafras*,) three hundred and eighty-four drams; guaiacum-wood, (*Guaiacum officinale*,) two hundred and fifty-six drams; fennel-seed, (*Semina fœniculi*,) two hundred and fifty-six drams; anise-seed, (*Semina pimpinella*,) two hundred and fifty-six drams; bearberry-leaves, (*Arctostaphylos uva-ursi*,) two hundred and fifty-six drams; betony-leaves, (*Betonica officinalis*,) two hundred and fifty-six drams; carrot-seed, (*Daucus carota*,) two hundred and fifty-six drams; gravel-root, (*Eupatorium purpureum*,) one hundred and twenty-eight drams; quebracho-bark, (*Aspidosperma quebracho*,) one hundred and twenty-eight drams; matico-leaves, (*Piper angustifolium*,) one hundred and twenty-eight drams; fine-leaved water-hemlock seed, (*Œnanthe phellandrium*,) one hundred and twenty-eight drams; pleurisy-root, (*Asclepias tuberosa*,) one hundred and twenty-eight drams; holly-leaved berberry-root, (*Berberis aquifolia*,) sixty-four drams; leaf-cup root, (*Polymnia uvedalia*,) sixty-four drams.

The above-named ingredients, in the quantities specified, are soaked in one hundred and fifty pounds of water for forty-eight hours. The whole compound is then boiled down to two-thirds of its original weight. While it is still boiling hot the liquid mixture is to be strained through a thick woolen cloth and well pressed out. The residue that is not strained through the cloth is returned to the kettle, and to it is added seventy pounds of water. This is then to be boiled down to one-third of its original weight, which quantity is to be strained and pressed, as before. The two liquids obtained by these strainings are then to be mixed together and brought to a boil. While boiling there are to be added the following ingredients: alum, (*Alumen sing. pulv.*,) six drams; calomel, (*Hydrargyrum chloridum mite*,) four drams; cinnabar, (*Cinnabaris pulv.*,) one dram; senna-leaves, (*Folia cassiæ*,) two hundred and fifty-six drams. The alum, calomel, and cinnabar are each to be tied up in a small linen bag before adding to the other ingredients. The whole mixture is then to be boiled down to two-thirds of its weight. At this point is to be added thirty pounds of refined sugar, and the whole is to be boiled down to the consistency of sirup. The resulting compound should weigh about fifty pounds. It is then ready to be bottled and for use. The dose to be taken is two table-spoonfuls every two hours.

This medicinal compound has been proved to be very efficacious in the treatment of consumption, syphilis, bronchitis, pneumonia, asthma, ulceration of the kidneys, bladder, and urethra, dyspepsia, chronic rheumatism, catarrh, malaria, jaundice, scrofula, dropsy, leucorrhœa, menorrhagia, and other diseases which are due to the impurities of the blood.

What I do claim as new, and desire to secure by Letters Patent, is—

The medicinal compound composed of sarsaparilla-root, juniper-berries, sassafras-bark, guaiacum-wood, fennel-seed, anise-seed, bearberry-leaves, betony-leaves, carrot-seed, gravel-root, quebracho-bark, matico-leaves, fine-leaved water-hemlock seed, pleurisy-root, holly-leaved berberry-root, leaf-cup root, senna-leaves, alum, calomel, and cinnabar, in substantially the proportions herein specified.

In testimony whereof I affix my signature in presence of two witnesses.

GEORGE ULRICH.

Witnesses:
 CHS. VTREUBER,
 JACOB F. WALTHER.